Sept. 29, 1964     H. J. AUVERMANN     3,151,247
HETEROGENEOUS RADIATION ANALYSIS USING A ROTATING
RETICLE FOR MODULATING DIFFERENT PORTIONS
OF A SPECTRAL DISPLAY
Filed May 31, 1961     3 Sheets-Sheet 1
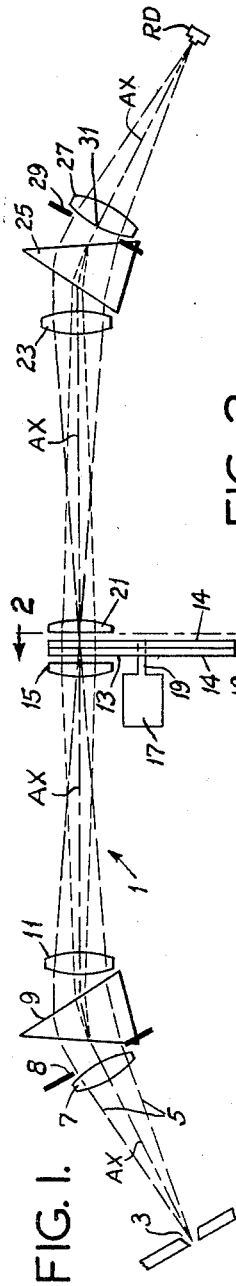
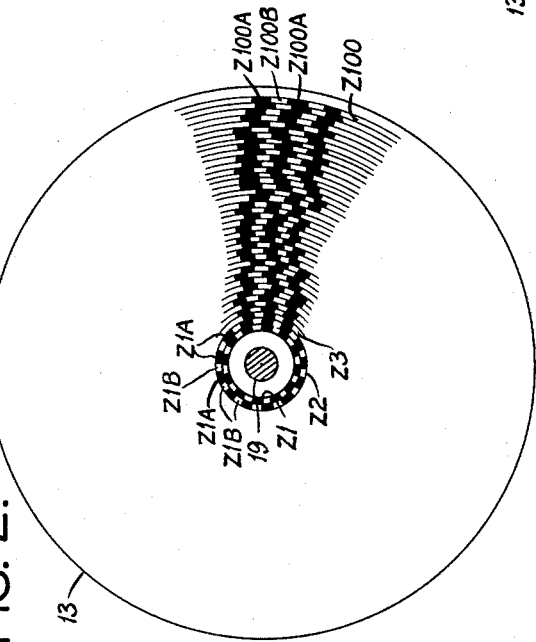
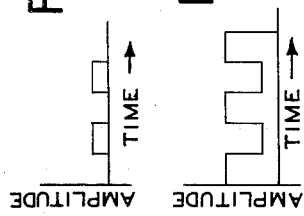
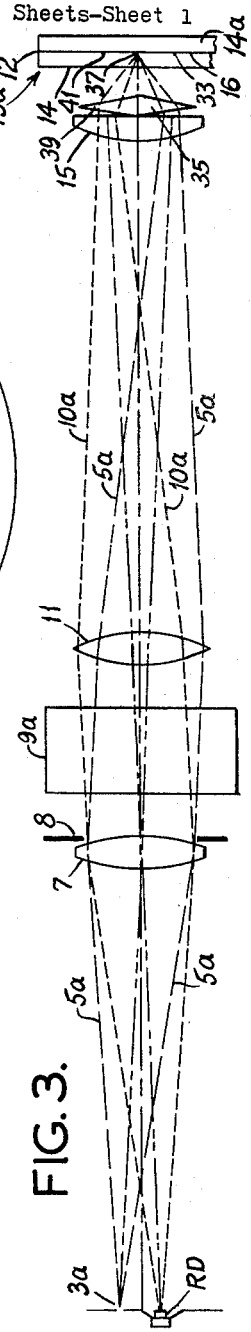

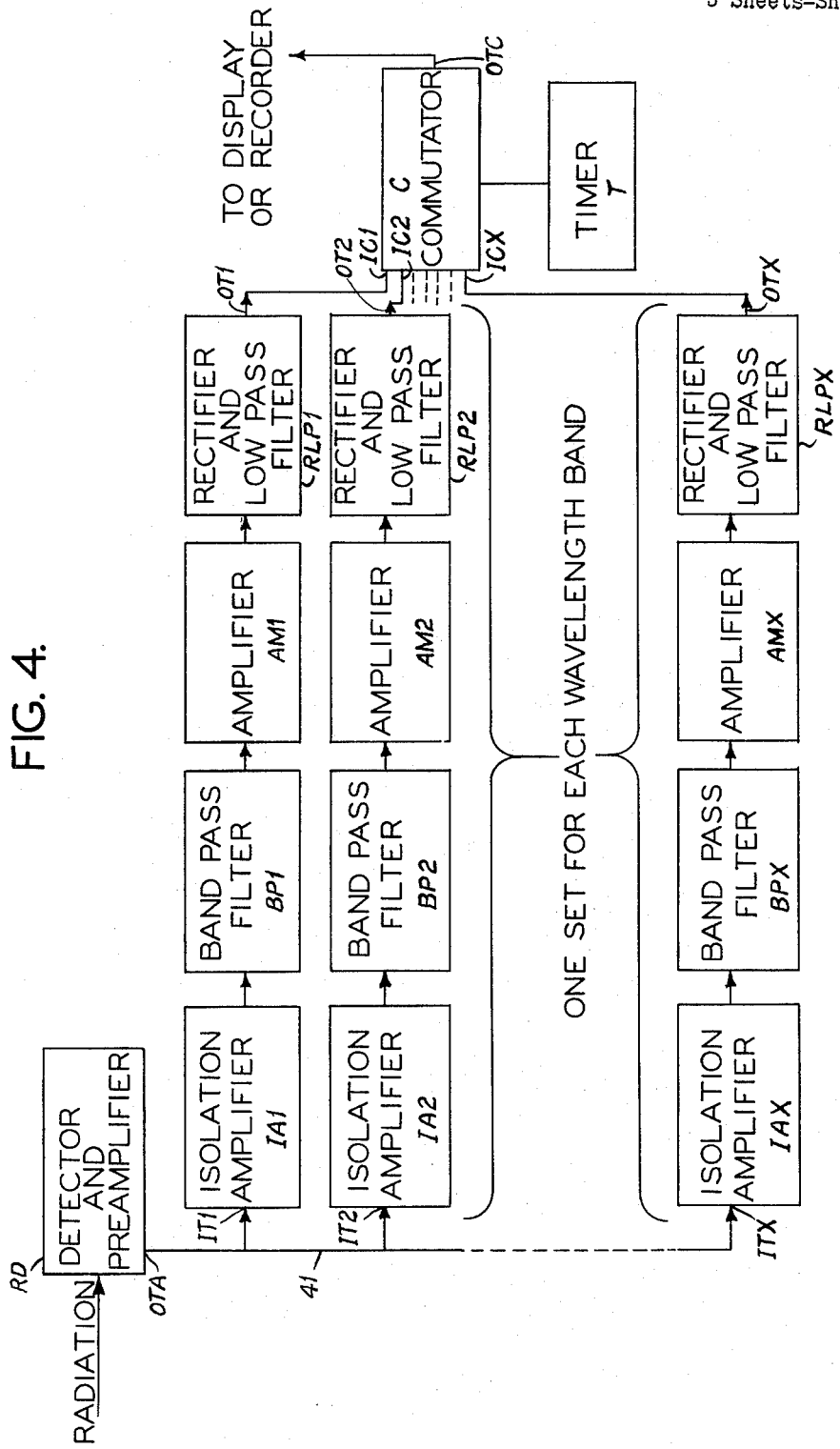

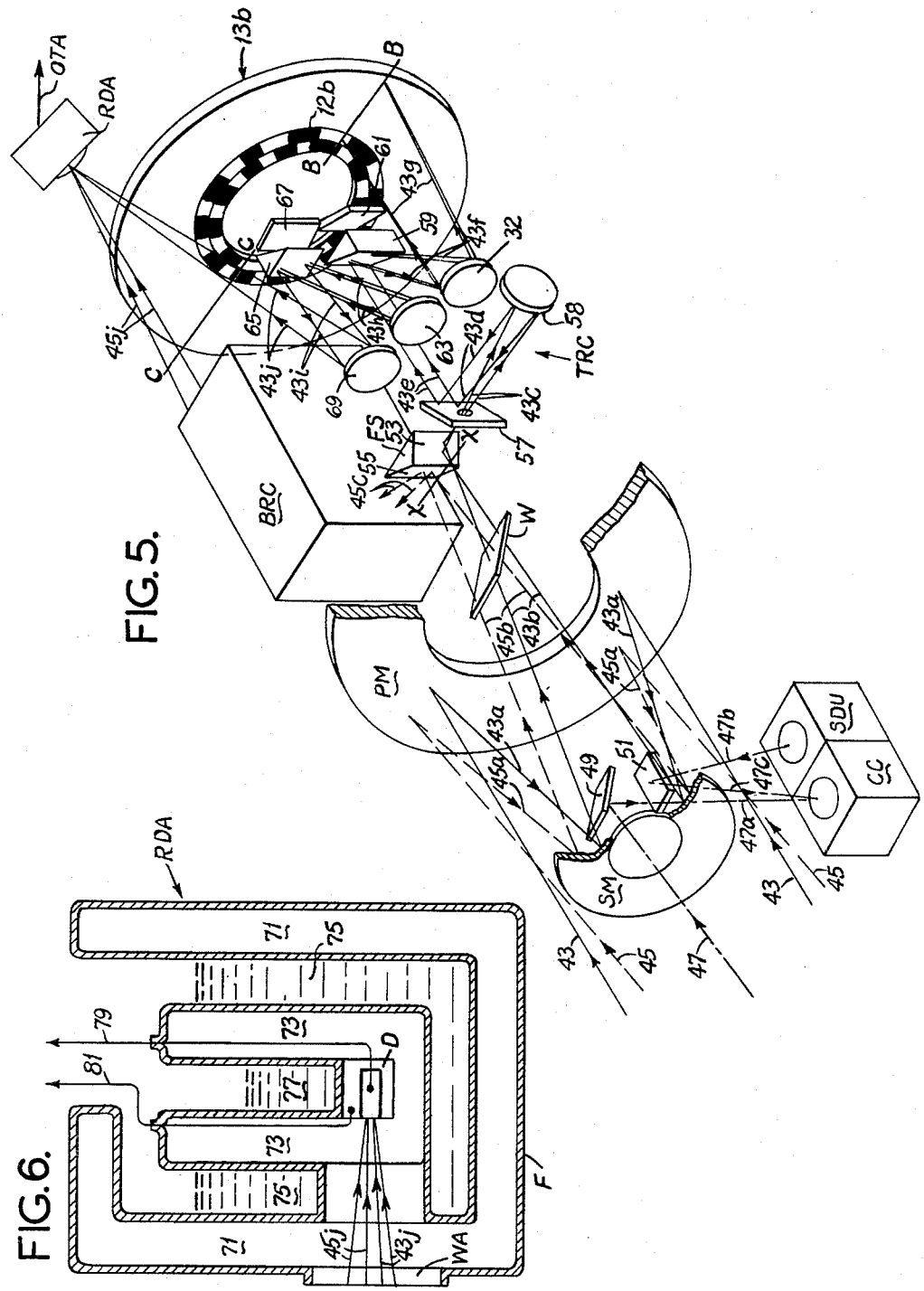

United States Patent Office 3,151,247
Patented Sept. 29, 1964

3,151,247
HETEROGENEOUS RADIATION ANALYSIS USING A ROTATING RETICLE FOR MODULATING DIFFERENT PORTIONS OF A SPECTRAL DISPLAY
Harry J. Auvermann, Dallas, Tex., assignor to Texas Instruments Incorporated, Dallas, Tex., a corporation of Delaware
Filed May 31, 1961, Ser. No. 113,740
17 Claims. (Cl. 250—226)

This invention relates to apparatus and methods for measuring radiation, and more particularly to spectrophotometric apparatus and methods for measuring the energy levels of different wavelength regions of heterogeneous electromagnetic radiation.

Among the several objects of the invention may be noted the provision of methods and apparatus for sensing and providing accurate spectrophotometric data on the energy levels of different wavelength regions of heterogeneous electromagnetic radiation, such as in the infrared, visible light and microwave frequencies; the provision of such methods and apparatus which have both high detectivity and high information capacity with highly desirable performance capabilities; the provision of methods and apparatus of the class described which have a fast response time or short time constant thereby permitting high-speed continuous spectral scanning; the provision of methods and apparatus for measuring the energy levels of different wavelength regions of electromagnetic radiation emanating from a discrete object, such as a target, located in a radiation-emitting background, such as the atmosphere; and the provision of such apparatus which is reliable in operation and may be made portable or mobile so as to be airborne, for example. Other objects and features will be in part apparent and in part pointed out hereinafter.

The invention accordingly comprises the constructions and methods hereinafter described, the scope of the invention being indicated in the following claims.

In the accompanying drawings, in which several of various possible embodiments of the invention are illustrated:

FIGURE 1 is a schematic diagram of one embodiment of spectrophotometric apparatus of the present invention;

FIGURE 2 is an elevation on an enlarged scale of one face of a reticle component taken on line 2—2 of FIGURE 1;

FIGURE 3 is a schematic diagram of a second embodiment of this invention;

FIGURE 4 is a block diagram of certain electronic components suitable for cooperation with the apparatus of FIGURE 3;

FIGURE 5 illustrates still another embodiment of the present invention;

FIGURE 6 is a cross section of a radiation detector unit suitable for use in this invention; and FIGURES 7a–7c are illustrations of electrical signal waveforms useful in understanding certain features of the present invention.

Corresponding reference characters indicate corresponding parts throughout the several views of the drawings.

A number of systems have been used or proposed for the analysis and measurement of heterogeneous electromagnetic radiation. Heterogeneous electromagnetic radiation refers to radiation in which the energy is transmitted over a range of frequencies as opposed to monochromatic (transmitted at a single frequency) or homogeneous radiation (transmitted in a single narrow band of frequencies). These prior-art systems have had various disadvantages, such as an inadequate information capacity, unsatisfactory detectivity, too long a response period, low signal-to-noise ratio, being too massive for convenient transportation, etc. Moreover, where the radiation to be measured was that emanating from a discrete object which was located in a background that emitted radiation, the background radiation would mask or cause erroneous results in the measurement of radiation from the object. In accordance with the present invention, methods and apparatus are provided which overcome these aforementioned disadvantages of existing systems. In essence the methods of the present invention disperse the heterogeneous electromagnetic radiation into its spectral components and display the spectral components spacially (as described herein, a line display). Then the intensity of the respective spatially displayed spectral components is modulated (as described herein, chopped with a square wave) at different frequencies so that each frequency of modulation is representative of a corresponding band of radiation wavelengths of said heterogeneous electromagnetic radiation. The resulting several intensity-modulated radiation signals are then collected and focused on a single radiation detector which produces a composite electrical signal having an amplitude which is a function of the magnitude of the composite radiation. This composite electrical signal is then separated into its component electrical signals each corresponding to one of the modulation frequencies. The amplitude of each of these component electrical signals is measured thereby giving an indication signal that is a function of the energy level (magnitude) of the corresponding band of wavelengths of the heterogeneous electromagnetic radiation. This method is to be sharply differentiated from spatially separating the heterogeneous radiation into spectral bands or subbands and individually determining the energy content of each band by a separate means for detecting the energy in that band, which system may be referred to as space-sharing; and from a time-sharing system in which a single radiation detector has impinged thereon in sequence the radiant energy in each different band. In the present invention the advantages of both systems of time-sharing and space-sharing are combined, but the disadvantages of each system (e.g., the complexity of the space-sharing system which requires a separate detector for each band, and the loss of signal-to-noise ratio in the time-sharing system inasmuch as only the radiation in a single wavelength band is impinged on a single radiation detector unit at any one time) are eliminated. Moreover, this invention includes a method wherein the total radiation from a target and its background is separated into two radiation signals which are separately dispersed and chopped out-of-phase and the intensity-modulated bands of each signal are collected and focused on a single radiation detector to form a composite electrical signal having an amplitude which is a function of the composite radiation. The components of the composte electrical signal, which are analogs of the background radiation components of the total radiation, are then canceled and the resulting modified composite electrical signal is thereafter separated into discrete electrical signals, the amplitude of each being measured as a function of the energy level of a respective one of the different wavelength regions of radiation emanating from the target.

Calibration of the equipment so that the amplitude of each of the discrete electrical signals is indicative of a particular energy level is attained by comparing the output with the output of a conventional standard of spectral radiation such as is obtainable from the National Bureau of Standards.

Further in accordance with my invention, apparatus is provided to carry out the above-described methods in which a novel combination of radiation-dispersing means, a rotating reticle with a series of zones of spaced-apart radiation-interrupting areas for chopping dispersed spectral bands of radiation, means for collecting and focusing the chopped or intensity-modulated radiation signals onto a single radiation detector and an electronic device for separating the composite electrical signal output of the detector into discrete electrical signals each corresponding to one of the modulation frequencies, is utilized together with means for measuring the amplitude of each discrete electrical signal as a function of the energy level of a respective one of the different wavelength regions of the radiation. Additionally included in my invention is such apparatus as outlined above which further includes structural components which will split heterogeneous electromagnetic radiation from a target and its environmental background radiation into two radiation signals each of which is dispersed into its spectral homogeneous or monochromatic bands or wavelengths and the two signals are chopped out-of-phase. Means are incorporated in such apparatus for focusing the composite of all the dispersed and chopped radiation signal components onto the single radiation detector and electronic units are provided for canceling the effect of background radiation so that substantially only the energy in the spectral bands of radiation from the target is measured.

Referring now more particularly to FIGURE 1, the optical components comprising a radiation channel of one embodiment of spectrophotometric apparatus of the present invention are generally indicated at numeral 1. The heterogeneous electromagnetic radiation to be analyzed is focused at an entrance aperture or slit 3. In this embodiment the radiation to be analyzed and measured is in the visible spectrum, although, as will be described hereinafter, the apparatus and methods of this invention will similarly analyze and measure radiation in the infrared, ultraviolet and microwave wavelengths. The optical axis of this optical radiation channel is referenced AX. As the radiation passes through aperture 3 it diverges to form a cone-shaped bundle of rays 5. A collimating lens 7 transforms this conical bundle of rays into a cylindrical one, the shape of which is defined by an aperture stop or plate 8. As the heterogeneous radiation traverses a prism 9 it is dispersed into its spectral radiation bands and therefore leaves prism 9 at varying angles relative to axis AX depending on the respective wavelengths of the bands and the dispersing action of this prism. A lens 11 focuses the dispersed radiation (comprising essentially a plurality of monochromatic homogeneous radiation rays) on the surface of a reticle 13 via an optional field lens 15. As the rays enter focusing lens 11 at varying angles they will be focused on different points on reticle 13. This reticle is constituted by a disk having a number of concentric ring-shaped zones $Z_1$–$Z_{100}$, each zone being constituted by a series of spaced-apart radiation-absorbing areas $Z_{1A}$–$Z_{100A}$, separated by radiation-transmitting areas $Z_{1B}$–$Z_{100B}$. Although, for purposes of clarity and to avoid unnecessary detail, only a portion of the radiation-absorbing and transmitting areas of zones $Z_1$–$Z_{100}$ are illustrated in FIGURE 2, it being understood that the number of pairs of radiation-absorbing and radiation-transmitting areas in each zone differs from that in each of the others. For example, the innermost zone $Z_1$ would have 100 opaque areas $Z_{1A}$ and 100 alternate radiation-transmitting areas $Z_{1B}$, while $Z_2$ would have 101 pairs of alternating radiation-absorbing and radiation-transmitting areas $Z_{2A}$, $Z_{2B}$. The outermost zone $Z_{100}$ would have 199 transparent areas $Z_{100B}$ and 199 opaque areas $Z_{100A}$. A motor 17 drives the reticle disk 13 at a substantially constant speed, for example, at 50 r.p.s. by means of a shaft 19. The pattern of the zones of reticle 13 and the alternate radiation and absorbing area which constitute each zone may be formed on a photographic emulsion 12 held between two transparent glass plates 14.

A suitable reticle may be constructed by having a master or template accurately drafted to scale and then photographically (such as by reducing) at the desired magnification, producing a reticle of the desired size and number of zones.

As disk 13 is rotated, the different spectral bands of dispersed radiation impinging on the left face (as viewed in FIG. 1) of reticle disk 13 are intermittently interrupted or chopped by the alternate radiation-absorbing and transmitting areas. Thus, the narrow wavelength band of radiation which is spread across zone $Z_1$ is intensity-modulated or chopped at a discrete frequency of 5000 c.p.s., while the adjacent wavelength region of radiation falling on zone $Z_2$ is chopped at a discrete frequency of 5050 c.p.s. Likewise all of the zones, including the outermost zone, intensity modulate their respective bands of radiation at a discrete frequency which differs by 50 c.p.s. from the frequencies of their adjacent bands. The chopped, dispersed spectral bands of radiation are passed through a second field lens 21 (which is identical to lens 15, but lens 15 could be made more powerful and thereby the lens 21 could be eliminated) and the conical bundle of rays is then collimated by a lens 23 (identical to lens 11) to a cylindrical bundle of rays which is transmitted through a prism 25 identical to prism 9 but set in the opposite direction with respect to the left and right progression of the radiation along optical axis AX. The dispersion produced by prims 9 is therefore cancelled and the resulting heterogeneous but chopped or intensity-modulated radiation is then focused by means of a lens 27 (identical to lens 7) onto a radiation detector RD. A stop 29 (identical to aperture stop 8) is interposed between prims 25 and lens 27 to decrease stray radiation without diminishing the desired radiation. Although it is preferred that lenses 7 and 27 have the same focal length and otherwise be identical, and that lenses 11 and 23 also be identical, it will be understood that other combinations of focal lengths and prisms can produce adequate but perhaps less perfect dispersion cancellation for purposes of this invention. For heterogeneous radiation having a median wavelength of about 0.4792 micron it is preferred that the lenses be corrected for chromatic and spherical aberration and coma by the use of quartz and fluorite elements. Extra dense flint glass may be used to fabricate the prisms. It will be understood that diffraction gratings may be used rather than prisms to disperse and cancel the dispersed radiation and that the reticle disk 13 may be convex or concave instead of flat.

The radiation focused on detector RD, comprising the composite of all the chopped or intensity modulated spectral bands, is converted by this radiation detector or transducer RD into a complex composite electrical signal having an amplitude which is a function of the magnitude of the radiant energy impinging thereon. An exemplary useful detector RD for the FIG. 1 embodiment is a phototube multiplier such as the type 6217 (the designation of the phtotottube as made by the Radio Corporation of America) which has a desirable response speed and a spectral response broad enough to detect radiation in a wavelength region including that between the "$h$" spectral line (0.407 micron) of hydrogen and the "$c$" spectral line (0.6563 micron) of hydrogen. The composite electrical signal of detector RD is separated, as will be described in more detail hereinafter, into 100 discrete electrical signals each corresponding to one of the 100 discrete frequencies of intensity modulation.

It will be noted that the portions of the optical radiation channel to the left of chopping pattern 15 is symmetrical with respect to the portion on the right thereof, i.e., a mirror image thereof. Thus the principal rays of all wavelengths are brought together at a point 31 in the plane of the exit pupil 29 which corresponds geometrically, relative to the plane of symmetry of the optical channel, to the plane of the entrance pupil as indicated at 8. This fact is taken advantage of in the second embodiment of this invention shown in FIG. 3.

In the optical system of FIG. 3, a reticle 13a is employed which differs from reticle 13 in that one of the transparent disk laminations 14a which sandwiches pattern 12 has one face (its left as viewed in FIG. 3) silvered or aluminized as indicated at 16 to form a mirror surface. Thus radiation passing through the transparent areas of the zones of pattern 12 is reflected back through the radiation-transmitting areas of the zones instead of simply being transmitted therethrough. The spectral bands of radiation impinging on the reticle 13a are therefore interrupted or chopped by alternate reflection and absorption. In this embodiment the rays of incident heterogeneous radiation enter a slit 3a, the principal incoming radiation rays being indicated at 5a. In order to separate the axis of incoming rays 5a from the returning chopped dispersed radiation rays 10a so that the radiation detector RD can be spatially offset from entrance slit 3a, another structural modification relative to the FIG. 1 embodiment is made which makes use of the fact that the full angular field of the lenses 7, 11 and 15 is not being utilized in a plane perpendicular to that on which the FIG. 1 apparatus is viewed. Thus FIG. 3 is, in effect, a view of apparatus on a plane at right angles relative to that of FIG. 1 and passing through the optical axis AX. The incoming rays 5a would normally focus at a point 33 in the plane of the pattern 12, but a prism 35, which has minimum color dispersion, bends the incoming rays 5a that issue from field lens 15 so that they strike pattern 12 at a point 37. The reflected, chopped returning rays 10a are bent by a prism 39, which has minimum color dispersion, so that they appear to issue from a point 41 which is the same distance above point 37 as point 33 is below point 37. These returning rays 10a pass through and are optically manipulated by field lens 15, focusing lens 11, a prism 9a and collimating lens 7, to be ultimately focused on detector RD displaced on the other side of the optical axis a distance equal to that which slip 3a is displaced. Prism 9a performs both the dispersion function of prism 9 and the dispersion cancellation function of prism 25 of FIG. 1. Lenses 7, 11 and 15 each performs the functions described in FIG. 1 as well as those of lenses 21, 23 and 27 of FIG. 1.

It will be understood that other equivalent structural arrangements apparent to those skilled in this art may be employed to displace or offset the focused image on RD from the entrance slit, such as by splitting lens 7 on the optical axis AX, tilting one of the halves thereof and interposing an angled mirror therebetween to deflect the returning rays so that they will focus at a point removed from entrance slit 3a. This arrangement takes advantage of the fact that all radiation that enters the lower part of aperture 3 (FIG. 1) returns through the upper part thereof. Such arrangement, however, utilizes only one half of the incoming radiant energy.

The radiation detector RD, which functions to convert the composite chopped spectral bands of the radiation signal into a composite electrical signal, preferably has associated therewith a preamplifier to amplify the level of the composite electrical signal. The output terminal of radiation detector and preamplifier, as indicated at OTA in FIGS. 4 and 5, is commonly connected by means of a conductor 41 to input terminals IT1, IT2–ITX of a number of similar isolation amplifiers IA1, IA2–IAX, one for each of the zones Z1–Z100. These amplifiers serve, inter alia, to prevent any interaction between the parallel separate electrical signal channels, each of which includes a band-pass filter unit (BP1, BP2–BPX), an amplifier (AM1, AM2–AMX) and a rectifier and low-pass filter unit (RLP1, RLP2–RLPX). Each of the band-pass filter units BP1–BPX is designed to pass only a discrete frequency corresponding to a discrete chopping or intensity modulation frequency of a spectral band of the heterogeneous radiation. Thus the band-pass filters BP1–BPX function to segregate or separate the composite intensity-modulated electrical signal output of the RD preamplifier into discrete electrical signals each of which has an amplitude which is a function of the radiant energy level of a different one of the wavelength regions or subbands of the heterogeneous radiation falling on the entrance slit 3 or 3a of the optical radiation channels illustrated in FIGS. 1 and 3. The band-pass filters may be of the passive type (resistance-capacitance-inductance) the active type (employing feedback) or any other type which will reject signals of unwanted frequencies. Units BP1–BPX are therefore each tuned to selectively pass only the essentially single frequency corresponding to the chopping frequency of one of the zones of reticle 13 or 13a, and thus has an electrical signal output sensing essentially only the radiation of a discrete spectral band.

The levels of the different signals passed by filters BP1–BPX are preferably individually amplified by amplifiers AM1–AMX and the A.C. signal outputs thereof are respectively and separately rectified to D.C. by individual rectifier and low-pass filter units RLP1, RLP2–RLPX, each having a respective output terminal OT1, OT2–OTX. The low-pass filter portion of RLP1–RLPX passes D.C. while rejecting unwanted A.C. components generated during rectification or due to electronic noise in the system. The frequency band-pass characteristics of the low-pass filter units determine the over-all system band-pass and time constant, and thus the information-handling and noise-rejecting capabilities for each wavelength band of incident radiation.

It will be understood that means for separating the composite electrical signal output of RD into the discrete electric signals other than those specifically described herein may be used.

The amplitude of the separate D.C. voltages present at any one time at terminals OT1–OTX, respectively, may be directly measured as a function of the energy levels of the respective different wavelength regions of incident heterogeneous radiation. Optionally, each of these terminals OT1–OTX may be electrically connected to a respective input contact (IC1, IC2–ICX) of a conventional commutator C which electrically or mechanically operates to repetitively and sequentially sample each of the respective signals present at OT1–OTX. Thus, as commutator C is driven by a timer T, the single output terminal OTC of commutator C provides an electrical signal output that time-shares the separate signals present at OT1–OTX. That is, these individual electrical signals at OT1–OTX are sequentially and repetitively sampled by the action of commutator C. The dwell time for each wavelength band may be controlled by any conventional arrangement, such as cams, to obtain any desired variation of time periods for the sampling of each wavelength band, e.g., the variation may be linear, logarithmic, etc.

In the embodiments of FIGS. 1 and 3, single optical radiation channels are disclosed which function to measure heterogeneous electromagnetic radiation from any source incident on the entrance aperture. The embodiment illustrated in FIG. 5 performs a similar function but discriminates between two sources of electromagnetic radiation and selectively measures the energy levels of different wavelength regions of heterogeneous radiation transmitted from one of the aforesaid sources. For example, if the radiation from a discrete object, such as an aircraft, missile, etc. (herein referred to as a target) is to be analyzed and the energy levels of its component radiation bands are to be measured, the apparatus of FIG. 5 will provide such data even though the target is located in a background or environment such as the atmosphere which itself emits electromagnetic radiation in the same general wavelength regions as that radiating from the target.

The collecting optics (hereinafter described) has a field of view optically split by the apparatus in a plane including the optical axis so that two equal area sectors of space are defined. Heterogeneous radiation in the infrared wavelength band of about 1–15 microns of interest (as well as light outside this wavelength band) from such a target (and the surrounding area adjacent thereto) emanating in one sector (target) is indicated by parallel solid lines 43 while the infrared radiation of the atmosphere emanating in the other sector (no-target) in the vicinity of the target location is represented by the parallel broken or dashed lines 45.

Visible light from the target (and the surrounding area adjacent thereto) is indicated by a dash-dot line 47. The visible wavelengths may be utilized for photographic recording by a cinecamera CC, the visible light rays 47 being reflected angularly from the optical axis by a mirror 49 along a path 47a. A synchronization display unit, SDU, may also be employed so that information as to time of day, operator remarks and other pertinent data may be correlated onto the photographic recording. The path of the visible rays transmitted from SDU to CC is indicated by the lines 47b and 47c. A mirror 51 is used to reflect these visible light rays 47b and 47c.

The collecting optics of the spectrophotometric apparatus of FIG. 5 includes a primary mirror PM and a secondary mirror SM, forming the primary and secondary of a standard Dall-Kirkham optical system. Mirror SM has a central hole through which visible light 47 passes. Rays 43 from the target sector are reflected in a convergent hollow cone form from the forward surface of PM along paths 43a toward the rear surface of SM, which in turn reflects and focuses this convergent hollow cone of rays along paths 43b through a window W upon a plane (referred to as the focal or image plane and indicated by a line X—X) perpendicular to the coincident optical axis of mirrors PM and SM. The balance of the components of the optical radiation channels of FIG. 5 are preferably housed in a hermetically sealed container of which W is the optical window. This window should have good transmission characteristics for infrared radiation in the 1–15 micron wavelength bands, and may be fabricated from, for example. KSR–5 (which is a thalium, bromide, iodide material with desirable infrared transmission characteristics available by designation KSR–5 from Harshaw Chemical Company, Cleveland 6, Ohio). The radiation from the atmospheric background no-target sector is similarly reflected from the mirror PM along paths 45a and focused by the secondary mirror SM on the image plane, represented by line X—X, along paths represented by lines 45b.

The composite of all infrared radiation emanating from the field of view of the collecting optics is presented as an image in the focal plane represented by X—X, at which plane is positioned a field splitter FS comprising two mirrored surfaces 53 and 55 set at 45°. The radiation from the target sector of the field of view is directed as indicated along paths 43c. This, of course assumes that the optical axis of the system is aligned so that the target is in only one sector. If desired, the optical axis may be aligned on the target so long as the field splitter FS is off-set from the optical axis sufficient to center the target only on one of its faces. The field of view of this apparatus may be further selected and varied by means of a conventional field stop (not shown, but similar to aperture 8 in FIGS. 1 and 2) constituted, for example, by a metal plate having an aperture. Such a field stop may be symmetrically or unsymmetrically positioned with respect to the optical axis so as to select any useful desired portion of the object plane to be viewed and it is large enough to encompass two adjacent sectors of space; one containing the target to be examined with an unavoidable background-emitting radiation, and the other or second sector containing only background. The heterogeneous infrared radiation from the target and the surrounding adjacent background, represented by the solid lines 43b, is reflected by face 53 of field splitter FS along path 43c, as a divergent hollow conical bundle of rays through an aperture of a mirror 57 against the surface of a collimating mirror 58. Mirrors 57 and 58 constitute two of several optical elements or components of a target radiation channel TRC. The radiation from the background area as represented by rays 45b is reflected by the face 55 of splitter FS in the form of a second divergent conical bundle of rays as indicated at 45c to a second or background radiation optical channel BRC, substantially identical to channel TRC which handles the radiation from the target and the unavoidable background radiation from the surrounding area adjacent thereto. In order to avoid obscuring the structure and operation of the apparatus of FIG. 5, the details of optical elements and components of channel BRC are not specifically illustrated but indicated generally at BRC.

The collimating mirror 58 converts the divergent hollow conical bundle of rays 43c to a hollow cylindrical bundle of rays 43d which are reflected from the reverse mirror surface of mirror 57 along a path indicated by rays 43e to impinge on a surface of prism 59. This prism, preferably of sodium chloride, disperses the heterogeneous infrared radiation signal of channel TRC into its spectrum of different, substantially monochromatic or homogeneous radiation wavelength regions. The dispersed spectral bands of radiation are reflected from a mirror 61 in a second pass back through prism 59 to further spread or disperse this infrared radiation, thereby forming an overlapping hollow cylindrical bundle of rays 43f which are focused by mirror 32 as dispersed hollow conical bundles of rays 43g along a line BB on the zoned pattern 12b of a rotating reticle 13b.

Reticle 13b is similar to reticles 13 and 13a described hereinbefore, except that 40 concentric circular or ring-shaped zones are provided. The inner zone in this instance has 101 reflecting areas and 101 alternate absorbing or diffusing areas, and each succeeding zone has two more infrared reflecting and two more infrared interrupting areas than its adjacent inner neighboring zone. Thus each zone has an uneven number of pairs of alternate reflecting and absorbing areas and differs in total number of pairs of such areas by two from the number of pairs of areas in its adjoining zones. The outer or fortieth zone will therefore have 181 pairs of alternate light-absorbing and -reflecting areas. Reticle 13b is driven at a constant rotational speed, e.g., 50 r.p.s., so that each of the 40 bands or subbands of radiation impinging on the 40 zones is chopped at a discrete frequency (5050–9050 c.p.s.), each separated by 100 c.p.s.

These 40 discrete intensity-modulated monochromatic radiation signals are reflected back to a collimating mirror 63 and directed along a path indicated at 43h to pass through another sodium chloride prism 65. The collimating mirror 63 cancels the conical divergence of the chopped infrared wavelength spectral bands and forms a hollow cylindrical bundle of chopped infrared wavelength rays 43h. The dispersion of the heterogeneous radiation effected by passing it twice through prism 59 is cancelled by similarly passing the chopped dispersed radiation in two passes through prism 65, which is identical to prism 59 and has associated with it in an identical fashion a mirror 67 (identical to mirror 61). The resulting hollow cylindrical bundle of rays 43i is reflected and focused by a focusing mirror 69 as a hollow converging bundle of rays 43j on the surface of a single radiation detector RDA.

The background infrared radiation is handled in an identical manner in the background radiation channel BRC except that this radiation signal is dispersed into a spatial spectral display along a line CC on the left side of rotating reticle 13b. Therefore, the dispersed background radiation is chopped 180° out-of-phase relative to that of the target channel TRC, inasmuch as there is an odd number of radiation-reflecting and -absorbing areas in each zone; and when a radiation-absorbing area in any one zone is aligned on BB a radiation-reflecting area falls on line CC. That is, for the same subband of wavelengths, reflection occurs in the target radiation channel during the instant that absorption takes place in the background radiation channel and vice versa. The chopped or intensity-modulated spectral bands of background radiation from channel BRC are also focused as indicated by rays 45j on the surface of the single radiation detector RDA.

It will be understood that although mirrors are preferred in the FIG. 5 apparatus (because their focusing and transmission characteristics do not change as a function of wavelength), lenses may be used if proper corrective measures known to those skilled in the art are taken. Also, means other than prisms may be used for dispersing the heterogeneous radiation into a spatial display of its spectral components, e.g. diffraction gratings, etc. It will also be noted that, although the various ring-shaped zones of the reticles are shown generally equal in width, they may be of differing widths, depending on the particular increment or band-width of wavelengh that is desired per discrete chopping frequency.

The details of an exemplary radiation detector RDA are illustrated in FIG. 6. The detector element itself, indicated at reference character D, is supported within a double Dewar flask F having a radiation-transmitting window WA. A particularly desirable detector element D may be fabricated from single-crystal germanium, doped with zinc and counterdoped with antimony to form a photoconductive type detector sensitive to radiation in the 1–15 micron region. It has fast response time (in the order of 1 microsecond or less) and is preferably maintained at a temperature of about 20° K. This is accomplished by evacuating an outer chamber 71 and an inner chamber 73, charging an intermediate chamber 75 with liquid nitrogen and an innermost chamber 77 with liquid helium. The composite chopped radiation signals focused on D vary their resistance as a function of the energy present in the impinging radiation. This resistance change is converted to a change in the amplitude of a D.C. potential by a conventional load resistor and constant D.C. potential source circuit serially connected with wires 79 and 81 to provide a composite electrical signal which is an analog of all of the energy in the radiation signals impinging on element D.

The separation of this composite electrical signal into separate discrete electrical signals each having an amplitude which is a function of the energy level in each different wavelength region is accomplished by electronic components illustrated in FIG. 4 and described above, except that 40 channels instead of 100 are utilized. Such circuitry not only separates the composite electrical signal into the desired discrete electrical signals, but also effects a cancellation of the background radiation energy so that essentially only the radiation from the target is sensed and measured in the various wavelength regions.

The operation of the apparatus of this invention to cancel background radiation is as follows: If it is assumed for purposes of simplified explanation that the energy level in one particular wavelength region of radiation chopped in the target radiation channel TRC is constant for a brief period, the discrete electrical signal analog component present in the composite electrical signal output of the radiation detector will have a waveform as illustrated in FIG. 7a. The solid line square waves have an amplitude which is the sum of that of the background radiation component, as indicated by the dashed-line square waves, and that of the target radiation energy in this subband, as indicated by the area between the dashed-line crests and the solid-line crests. At the same instant, the discrete electrical signal analog of radiation chopped in the background radiation channel BRC has a waveform as indicated in FIG. 7b. Because of the 180° out-of-phase chopping in BRC relative to that in TRC, the chopped discrete electrical signal component analogous to the chopped radiation wavelength component from the background channel BRC is displaced 180° as indicated in FIG. 7b. These two electrical signals are superimposed as part of the common composite electrical signal inputs at IT1, IT2–ITX of the isolation amplifiers, so that this portion of the input signal to each isolation amplifier IA1, IA2–IAX has a wave form as indicated in FIG. 7c. As this is a pulsating D.C. signal and the isolation amplifiers will pick off the A.C. components thereof, the output of the isolation amplifiers comprises an A.C. signal having an amplitude pattern as indicated in FIG. 7c, the D.C. component represented by the background radiation signal analog thereby being lost as it is simply a constant D.C. level. Thus, discrete electrical signals analogous to the different wavelength regions of radiation emanating from the target are provided at output terminals OT1, OT2–OTX. These signals can be commutated as described heretofore so that the energy level of each successive one of the 40 wavelength regions of target radiation is sequentially and repetitively sampled and these samples are time-shared at the single output terminal OTC of the commutator.

Because of the compactness of this FIG. 5 apparatus it may be used as a portable or mobile unit and may be airborne if desired. The systems of this invention have high detectivity and information capacity as well as a fast response speed.

It will be understood that radiation detectors other than a phototube multiplier, or a photoconductive doped germanium cell may be used, such as other types of photoelectric and photoconductive cells and various other types of thermal detectors.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. Apparatus for measuring the energy levels of different wavelength regions of heterogeneous electromagnetic radiation emanating from a target located in a radiation-emitting background, comprising means for separating the radiation into a first radiation signal containing radiation from said target and said background and a second radiation signal containing background radiation only, a target-background radiation channel adapted to receive said first radiation signal, a background radiation channel adapted to receive said second radiation signal, said channels being substantially identical in structure, each channel comprising means for dispersing its received radiation signal into a spatial spectral display of the components of said received radiation, a moving reticle onto which the spectral display is impinged, said moving reticle having a plurality of zones each of which includes a series of a different number of spaced-apart radiation-interrupting areas adapted to modulate different portions of the spectral display at a discrete frequency, the radiation-interrupting areas in the first channel being positioned so that the modulation in the respective channels is 180° different in phase, a radiation detector adapted to produce an electrical signal having an amplitude which is a function of the energy of radiation to which it is exposed, means for collecting the modulated spectral bands of the first and second radiation signals and focusing the composite thereof on said detector, said detector providing a composite electrical signal which is substantially an analog of the magnitude of the radiation emanating from said target, electronic means for separating said composite electrical signal into discrete electrical signals each corresponding to one of said frequencies of modulation, and means for measuring the amplitude of each of said discrete electrical signals as a function of the energy level of a respective one of said different wavelength regions of the radiation emanating from said target.

2. Spectrophotometric apparatus as set forth in claim 1 in which said moving reticle is rotary and the zones are concentric rings.

3. Spectrophotometric apparatus as set forth in claim 1 in which adjacent radiation-interrupting areas in each zone are separated by radiation-transmitting areas.

4. Spectrophotometric apparatus as set forth in claim 1 in which adjacent radiation-interrupting areas in each zone are separated by radiation-reflecting areas.

5. Spectrophotometric apparatus as set forth in claim 2 in which each said radiation-interrupting area is radiation-absorbing and each zone comprises alternate radiation-reflecting and radiation-absorbing areas.

6. Spectrophotometric apparatus as set forth in claim 5 in which there is an odd number of pairs of alternate reflecting and absorbing areas in each zone and the number of pairs of alternate areas in each zone differs by two pairs from the number of pairs of alternate reflecting and absorbing areas in each said adjacent zone.

7. Spectrophotometric apparatus as set forth in claim 1 in which a single common moving reticle is utilized for both channels and the first dispersed radiation signal is impinged on a first portion of said moving reticle and the second dispersed radiation signal is impinged on a second portion of said moving reticle.

8. Spectrophotometric apparatus as set forth in claim 1 in which said electronic separating means comprises a plurality of individual filter-amplifier units, each filter-amplifier unit having a band-pass filter tuned to selectively pass a frequency corresponding to a respective discrete modulation frequency.

9. Spectrophotometric apparatus as set forth in claim 8 which further includes commutator means having a plurality of input terminals and an output terminal, each of said input terminals being connected to the output of a respective one of said filter-amplifier units whereby the amplitude of each of said discrete electrical signal is sampled sequentially and repetitively at said commutator output terminal.

10. Spectrophotometric apparatus as set forth in claim 1 in which the radiation detector is a photoconductive detector.

11. Spectrophotometric apparatus as set forth in claim 10 in which the photoconductive detector is a zinc-doped germanium detector cooled to a temperature of approximately 20° K.

12. Spectrophotometric apparatus as set forth in claim 1 in which the radiation detector is a phototube.

13. Spectrophotometric apparatus as set forth in claim 1 in which the means for dispersing the radiation is a prism.

14. Spectrophotometric apparatus as set forth in claim 1 in which both the radiation-dispersing means and the collecting and focusing means comprises prisms.

15. Apparatus for measuring the energy levels of different wavelength regions of infrared radiation emanating from a target located in an infrared radiation-emitting background, comprising a field splitter for separating the radiation into a first infrared radiation signal containing radiation from said target and said background and a second infrared radiation signal containing background radiation only, a target-background radiation optical channel adapted to receive said first radiation signal, a background-radiation optical channel adapted to receive said second radiation signal, said channels being substantially identical in structure, each channel including a prism for dispersing its received radiation signal into a spatial display of its spectral components onto a single rotary disk-shaped reticle having a plurality of concentric ring-shaped zones each of which includes a series of a different number of alternate adjacent infrared-absorbing and infrared-reflecting areas, means for rotating said reticle at a substantially constant speed, means for forming separate images of said first and second dispersed radiation signals, said reticle being positioned relative to said images wherein a wavelength region of the first image is instantaneously swept by a radiation-absorbing area in one zone while the same wavelength region of the second image is swept by a radiation-reflecting area in the same zone whereby as said reticle is rotated the respective spectral bands of the first and second radiation signals are modulated out-of-phase at discrete frequenceis, an infrared radiation detector adapted to produce an electrical signal having an amplitude which is a function of the energy of radiation to which it is exposed, means for collecting the intensity-modulated spectral bands of the first and second radiation signals and focusing the composite thereof on said detector, electronic means for cancelling the background-radiation components of said first and second signals whereby said electrical signals are modified to a composite electrical signal which is substantially an analog of the radiation emanating from said target, individual bandpass filter-amplifiers for separating said composite electrical signal into discrete electrical signals each corresponding to one of said frequencies of modulation, an electrical commutator having a plurality of input terminals and an output terminal, each of said input terminals being connected to the output of a respective one of said filter-amplifiers whereby the amplitude of each of said discrete electrical signals is sampled sequentially and repetitively at said commutator output terminal, and means for measuring the amplitude of each of said discrete electrical signal samples as a function of the energy level of a respective one of said different wavelength regions of the radiation emanating from said target.

16. Apparatus as set forth in claim 15 in which said radiation detector is a zinc-doped germanium detector operated at a temperature in the order of 20° K.

17. Apparatus for measuring the energy levels of different wavelength regions of heterogeneous electromagnetic radiation emanating from a target located in a radiation-emitting background, comprising means for separating the radiation into a first radiation signal containing radiation from said target and said background and a second radiation signal containing background radiation only, a target-background radiation channel adapted to receive said first radiation signal, a background radiation channel adapted to receive said second radiation signal said channels being substantially identical in structure, each channel comprising means for dispersing its received radiation signal into a spatial spectral display of the components of said received radiation, a moving reticle onto which the spectral display is focused, said moving reticle having a plurality of zones each of which includes a series of a different number of spaced-apart radiation-interrupting areas adapted to modulate a different portion of said spectral display at a discrete frequency, the radiation-interrupting areas in the first channel being positioned so that the modulation in the respective channels is 180° different in phase, a radiation detector adapted to produce an electrical signal having an amplitude which is a function of the energy of radiation to which it is exposed, means for collecting the intensity-modulated spectral bands of the first and second radiation signals and focusing the composite thereof on said detector, said detector providing a composite electrical signal which is substantially an analog of the magnitude of the radiation emanating from said target, and means for utilizing said composite electrical signal.

References Cited in the file of this patent

UNITED STATES PATENTS

| | | |
|---|---|---|
| 2,004,360 | Ahronheim | June 11, 1935 |
| 2,403,983 | Koenig | July 16, 1946 |
| 2,540,780 | Gabel et al. | Feb. 6, 1951 |
| 2,710,559 | Heitmuller et al. | June 14, 1955 |
| 2,877,356 | Iddings | Mar. 10, 1959 |
| 2,892,124 | Rabinow | June 23, 1959 |
| 3,010,677 | Guthrie et al. | Nov. 28, 1961 |
| 3,024,365 | Smith et al. | Mar. 6, 1962 |
| 3,025,744 | Collyer et al. | Mar. 20, 1962 |
| 3,100,264 | Jaffe et al. | Aug. 6, 1963 |